May 19, 1964     H. F. HEATH, JR     3,134,095

CRYOGENIC MEMORY SYSTEMS

Filed June 24, 1958     9 Sheets-Sheet 1

*INVENTOR.*
HAROLD F. HEATH, JR.
BY John E. Dougherty Jr.

*ATTORNEY*

May 19, 1964   H. F. HEATH, JR   3,134,095
CRYOGENIC MEMORY SYSTEMS
Filed June 24, 1958   9 Sheets-Sheet 3

May 19, 1964   H. F. HEATH, JR   3,134,095
CRYOGENIC MEMORY SYSTEMS
Filed June 24, 1958   9 Sheets-Sheet 9

United States Patent Office 3,134,095
Patented May 19, 1964

3,134,095
CRYOGENIC MEMORY SYSTEMS
Harold F. Heath, Jr., Poughkeepsie, N.Y., assignor to International Business Machines Corporation, New York, N.Y., a corporation of New York
Filed June 24, 1958, Ser. No. 744,157
12 Claims. (Cl. 340—173.1)

The present invention relates to cryogenic circuits and systems and, more particularly, to improved cryogenic memory systems and novel comparison and read out circuits usable in such systems.

An article by D. A. Buck entitled "The Cryotron—A Superconductive Computer Element," which appeared in the April 1956 issue of the Proceedings of the IRE at pages 482–493, includes a summary both of the theory of superconductivity and the history of its development, and cites a number of informative publications on the subject. This article is directed, in the main, to a discussion of superconductive circuits such as might be used in computer applications and proposes as a basic switching or gating element for such circuits a device termed a cryotron which comprises a gate conductor of a superconductive material around which is wound a control coil. The control coil is preferably fabricated of a superconductive material requiring a more intense magnetic field to drive it into a normal or resistive state at the operating temperature of the circuit than is required to so drive the superconductive material of the gate conductor. Cooling apparatus is provided for maintaining both the gate and coil below the temperatures at which the superconductive materials of which they are fabricated undergo transitions between normal and superconductive states in the absence of a magnetic field. The gating function is achieved by energizing the control coil with sufficient current to render it effective to apply to the gate conductor a magnetic field of sufficient intensity to cause the gate conductor to assume a normal or resistive state. Devices of this type need not be wire wound but may be also fabricated using thin films, as is illustrated in copending application Serial No. 625,512, filed November 30, 1956, in behalf of R. L. Garwin and assigned to the assignee of the subject application.

Another article entitled "A Cryotron Catalog Memory System" appeared at pages 115–119 of the Proceedings of the Eastern Joint Computer Conference, held in December 1956, which were published by the American Institute of Electrical Engineers in 1957. The catalog memory system described in this article is constructed using as storage elements cryotron trigger circuits. These trigger circuits are arranged in columns and rows and in operation each row of the memory is used to store the binary values of a single information word. Each of the trigger circuits in the memory is provided with a comparison circuit and the memory is interrogated by applying to these circuits pulses representative of a particular word. The output obtained upon interrogation is in the form of a voltage signal which indicates whether or not the word for which the memory is interrogated is stored in the memory.

In accordance with the principles of the subject invention, applicant has provided improved compare circuits which may be employed in memory systems of the above described type. Applicant has also provided improved memory systems by employing novel interconnections between the compare circuits which may be either the prior art type or the novel type disclosed herein. Further, applicant has provided an improved read out circuit which may be utilized in cryogenic memory systems and which is disclosed herein in a system which is termed a tag or associative memory. This memory consists of two registers each comprising a number of rows of cryogenic storage devices. The first register is termed a Tag Register and each of the storage devices therein is provided with a compare circuit. The second register is a Word Register and each storage device therein is provided with a read out circuit. Input information is entered in the memory by storing each word of information in a particular row of the Word Register and coincidently storing in a corresponding row of the Tag Register a tag or identifying word for the information word. The memory is interrogated by applying to the compare circuits in the Tag Register pulses representative of a particular tag and, if that tag is present in the memory, an indication is obtained and the corresponding word is read out of the Word Register. In one preferred embodiment of an associated or tag memory disclosed herein by way of illustrating the principles of the invention, a novel compare circuit is employed in the Tag Register and a novel read out circuit in the Word Register. Each of these circuits are so constructed that they always provide at least one superconductive path under all conditions of operation, thereby allowing all the compare circuits to be series connected with one signal source and all the read out circuits to be similarly series connected to another signal source. Further, the compare circuits for each row of the Tag Register are connected in a logical OR circuit which provides an output indication for that row when, upon interrogation, the interrogate tag, that is, the tag for which the memory is interrogated, does not compare with the tag stored in that row. This type of circuit arrangement may be used with the prior art compare circuits as well as with the novel compare circuits, herein disclosed and allows memories of either the catalog or associative type to be constructed without there being any limit to the number of storage positions in each row of the memory.

Further embodiments of the invention herein disclosed show a number of novel compare circuits constructed in accordance with the principles of the invention, some of which may be connected, as above, in OR circuits to provide the comparison indications and others of which may be connected in AND circuits to provide the required comparison indications. In one such embodiment, a compare circuit is provided which operates as a steering circuit which directs a current to one or the other of two output leads in accordance with whether or not a comparison is obtained. This circuit is particularly adapted to use in memory systems of the tag or associative type.

Accordingly, it is an object of the present invention to provide improved cryogenic memory systems.

A more particular object is to provide improved catalog and/or associative cryogenic memory systems.

A further object is to provide systems of these types wherein a large number of storage devices may be included in each row of the memory without thereby rendering the operation of the memory subject to extremely critical circuit parameters.

Still another object of the invention is to provide catalog and/or associative cryogenic memories which, under all conditions of operation, provide at least one superconductive path for each cirrent signal applied thereto.

A further object is to provide novel cryogenic compare circuits and also memory systems using such circuits.

Another object is to provide a catalog type memory wherein the compare circuits for each row in the memory are connected in a logical OR circuit.

Another object is to provide an improved cryogenic compare circuit which functions to steer or direct an applied current to one or the other of two outputs in accordance with whether or not a comparison is obtained, as well as catalog and/or associative memory systems using this type compare circuit.

Still another object is to provide an improved cryogenic circuit for reading out information stored in a cryogenic memory device, as well as memory arrays using these devices connected so that the memory may be addressed to selectively and non-destructively read out any word stored therein.

A further object is to provide novel catalog and/or associative memories including compare circuits wherein the compare circuits for each row are connected in one side of a trigger circuit which indicates whether or not a comparison is obtained when the memory is interrogated.

Still another object is to provide memories of the last described type wherein the compare circuits are connected to provide an OR circuit input to the trigger circuits; a further object is to provide a memory of this type wherein the compare circuits are connected to provide an AND circuit input to the trigger circuits.

Other objects of the invention will be pointed out in the following description and claims and illustrated in the accompanying drawings, which disclose, by way of example, the principle of the invention and the best mode, which has been contemplated, of applying the principle.

In the drawings:

FIGS. 10A, 10B, 10C and 10D, taken together, show, using block diagram representations, a memory system constructed in accordance with the principles of the invention.

FIG. 11 shows the manner in which FIGS. 10A, 10B, 10C and 10D are arranged to form a single circuit diagram.

Figure 1:
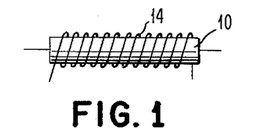
FIG. 1 is a diagrammatic representation of a cryotron.
Figure 1A:
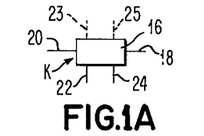
FIGS. 1A and 1B are block diagram representations of the cryotron of FIG. 1.
Figure 1B:
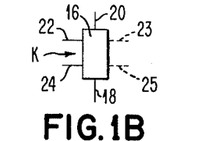

There is shown in FIG. 1 a diagrammatic representation of a wire wound cryotron which is a gating device comprising a gate conductor 10 of a superconductive material around which is wound a control conductor in the form of a coil 14. In operation, the device is maintained at a temperature below that at which the superconductor material of the gate conductor undergoes transitions between normal and superconductive states in the absence of a magnetic field. The gate conductor is, thus, normally in a superconductive state but may be driven into a normal state by energizing the control conductor with sufficient current to cause the gate conductor to be subjected to a magnetic field which is more intense than the critical field for the gate conductor at the operating temperature. The control conductor is preferably fabricated of a superconductive material having a higher critical field than that of the gate conductor so that it may be energized to drive the gate conductor resistive and still remain in a superconductive state. In the illustrative embodiments of the circuits of the invention shown in the other figures, the block diagram forms of FIGS. 1A or 1B are utilized to represent cryotrons; the central block 16 represents the gate and the leads 18 and 20 the connections to the gate; one or the other of the leads 22 and 23 represents one connection to the control coil; and one or the other of the leads 24 and 25 represents the other connection to the control coil. The designation K with numeral designations is employed to identify particular cryotrons in the circuits about to be described. It should be noted here that, though the circuits illustrating the principles of the invention are herein shown constructed with wire wound cryotrons, these circuits may be constructed using film type cryotrons of the type shown and described in copending application Serial No. 625,512 filed November 30, 1956, in behalf of R. L. Garwin and assigned to the assignee of this application.

Figure 2:
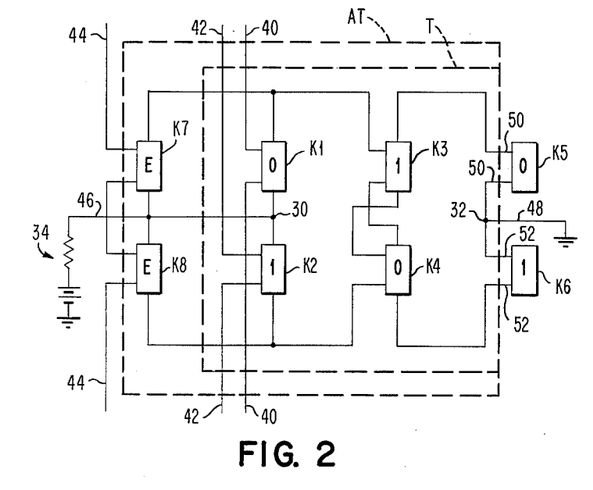
FIG. 2 is a diagrammatic representation of an addressable cryotron trigger circuit.

FIG. 2 shows an addressable cryotron trigger circuit of the type shown and described in the article published in the Proceedings of the Eastern Joint Computer Conference which is cited above. This circuit comprises a cryotron trigger with a pair of cryotrons connected in parallel with the input cryotrons for the trigger for controlling the application of inputs to the circuit. The trigger circuit includes six cryotrons K1–K6 which are connected in two parallel current paths between a pair of terminals 30 and 32, the former terminal being connected to a current source 34 and the latter either directly to ground, as shown, or through further superconductive circuits to a common or ground terminal. One of the parallel current paths includes the gates of cryotrons K1 and K4 and the control coils of cryotrons K3 and K6, and the other includes the gates of cryotrons K2 and K3 and the control coils of cryotrons K4 and K5. Inputs for the circuit are applied to the control coils of cryotrons K1 and K2, inputs representative of a binary zero being applied to the former and inputs representative of a binary one to the latter mentioned coil. When the circuit is in the binary one state, the cryotrons K2, K3 and K6 are resistive and, when in the binary zero state, the other three cryotrons are resistive, as is indicated by the "1" and "0" designations in the blocks representing the gates of these cryotrons. When in either of these states, the current from source 34 is entirely in the path including the superconductive cryotron gates. Cryotrons K3 and K4 may be termed cross coupling cryotrons since their coils and gates are connected in different paths so that they are effective to maintain the circuit stably in the binary zero and binary one states, respectively. The state of the circuit is manifested by the condition of the gates of cryotrons K5 and K6, the former being resistive and the latter superconductive when the circuit is in the binary zero state and the condition of each being reversed when the circuit is in the binary one state. The cryotrons K7 and K8 are termed enable cryotrons and have their gates connected across the gates of input cryotrons K1 and K2, respectively. These cryotrons must be driven resistive before inputs applied to the zero and one input lines 40 and 42, which are connected to the coils of cryotrons K1 and K2, respectively, are effective to change the stable state of the circuit. The enable inputs are applied to a line 44 which is connected to the control coils for cryotrons K7 and K8 and it is only when a signal is applied to this line that the state of the trigger circuit may be altered by applying an input signal to one or the other of the lines 40 and 42.

Figure 2A:
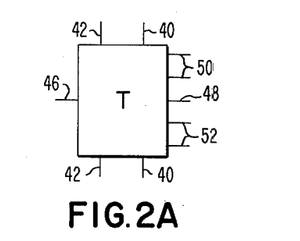
FIG. 2A is a block diagram which represents the trigger of FIG. 2 without the enable inputs.
Figure 2B:
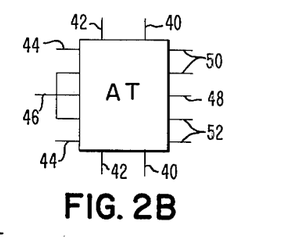
FIG. 2B is a block diagram which represents the trigger of FIG. 2 with the enable inputs.

The trigger circuit of FIG. 2 is, of course, usable with and without the enable cryotrons and, in the circuits shown in the other figures, this circuit, which is encompassed within the dotted block T in FIG. 2, is represented by the block diagram shown in FIG. 2A with the lines 40 and 42 representing the zero and one input leads, the lines 46 and 48 the supply current leads, the lines 50 the leads to the control coil of the zero output cryotron (K5 in FIG. 2), and the lines 52 the leads to the control coil of the one output cryotron (K6 in FIG. 2). Similarly, the entire addressable trigger circuit of FIG. 2 including the enable cryotrons, when shown in the latter figures, is represented by the block diagram AT of FIG. 2B, the portion of the circuit represented by the block being encompassed with the dotted block labeled AT in FIG. 2. The same designations as are used in FIG. 2 are employed to represent the various input and output connections to the block diagram of FIG. 2B.

*Compart Circuit A*

Figure 3:
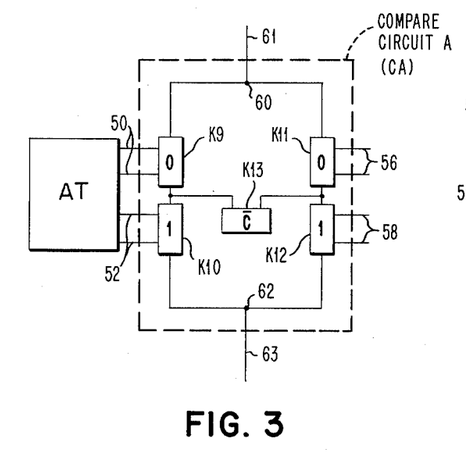
FIG. 3 is a diagrammatic showing of a compare circuit constructed in accordance with the principles of the invention.
Figure 3A:
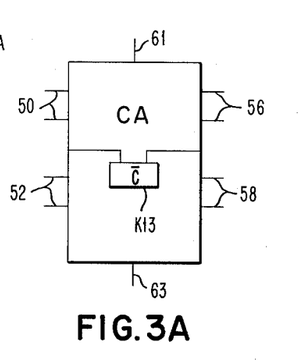
FIG. 3A is a block diagram which represents the compare circuit of FIG. 3.

Referring now to FIG. 3, there is shown a comparison circuit which is hereafter to be known as compare circuit A and which may be utilized to interrogate the state of a trigger circuit such as is shown in FIG. 2. In FIG. 3, only the output coil leads for the trigger AT represented in block form are illustrated. The coils connected to these leads control the state of cryotrons K9 and K10, respectively, which correspond to the output cryotrons K5 and K6 shown in FIG. 2. Cryotron K9 is resistive when the trigger AT is in the zero state and cryotron K10 is resistive when the trigger is in the one state. The comparison circuit also includes two other cryotrons K11 and K12 provided with control coils 56 and 58 to which interrogate inputs representative of binary zero and binary one, respectively, are applied, and a further cryotron K13 which indicates the result of an interrogation or comparison operation. Supply current for the circuit of FIG. 3 is applied at a lead 61 which is connected to terminal 60 from which this current may flow through one of four possible paths to a terminal 62 and lead 63 which is connected either directly or through further circuitry, which is preferably superconductive, to ground. The first of these paths includes the gates of cryotrons K9 and K10; the second includes the gates of cryotrons K11 and K12; the third includes the gates of cryotrons K9 and K12 and the control coil of cryotron K13; and the fourth path includes the gates of cryotrons K11 and K10 and the control coil of cryotron K13. When the trigger AT is in a binary zero condition and an interrogate input representative of one is applied, cryotrons K9 and K12 are resistive and cryotrons K11 and K10 superconductive so that the current from terminal 60 flows in the then entirely superconductive fourth path, thereby energizing the control coil of cryotron K13. Similarly, when the trigger AT is storing a binary one and an interrogate input of zero is applied, the only completely superconductive path available is through the gate of cryotron K9, control coil of cryotron K13 and the gate of cryotron K12. Thus, when the interrogate input does not compare with the value stored in the trigger AT, the gate of cryotron K13 is driven resistive indicating the non-comparison. The designation C̄ within the block representation for the gate of cryotron K13 is employed to indicate that this cryotron is resistive only when the interrogate input does not compare with the value stored in trigger AT. When there is a comparison, either the gates of the cryotrons K9 and K11 or the gates of the cryotrons K10 and K12 are resistive so that the current divides between the first and second paths and the current, if any, in the coil of cryotron K13 is insufficient to drive the gate of this cryotron resistive. This output cryotron, therefore, remains superconductive indicating a comparison between the interrogate input and the value stored in trigger AT. In circuits shown in the figures later to be described, the block diagram CA of FIG. 3A is used to represent the portion of the compare circuit shown within the dotted box CA in FIG. 3, the designations used to identify the control coils and the supply current leads corresponding to those shown in FIG. 3.

*Compare Circuit B*

Figure 4:
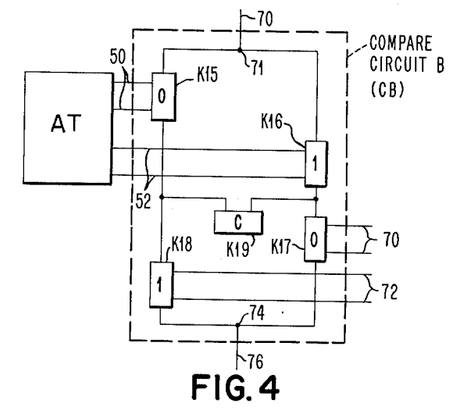
FIG. 4 is a diagrammatic showing of a further embodiment of a compare circuit constructed in accordance with the principles of the invention.
Figure 4A:
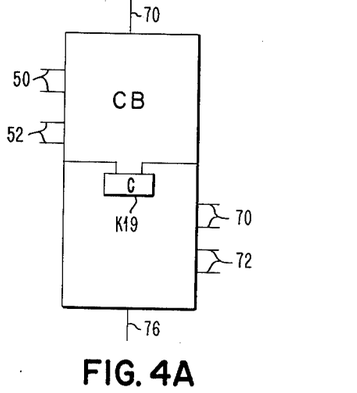
FIG. 4A is a block diagram which represents the compare circuit of FIG. 4.

Referring now to FIG. 4, there is shown another embodiment of a comparison circuit constructed in accordance with the principles of the invention. In this circuit, which is hereafter referred to as compare circuit B, the output of the trigger AT controls the state of a pair of cryotrons K15 and K16, the former being resistive when the trigger is in a binary zero state and the latter being resistive when the trigger is in a binary one state. The interrogate inputs are applied to control coils 70 and 72 for a pair of cryotrons K17 and K18, respectively, so that the former cryotron is resistive for an interrogate input representative of binary zero and the latter cryotron is resistive for an interrogate input representative of a binary one. The supply current for the circuit is applied to a lead 70 which is connected to a terminal 71 from which the current may flow through one of four parallel paths to a terminal 74. The latter terminal is connected to a lead which, in turn, may be connected through further superconductive circuitry (not shown) to ground. The output of the circuit is manifested by the state of an output cryotron K19, the block representation for which includes the designation C indicating that this cryotron is resistive when the interrogate input compares with the value stored in the trigger AT. For example, when the trigger AT is storing a binary zero and cryotron K15 is, therefore, resistive and an interrogate pulse is applied to the coil 70 of cryotron K17 to drive that cryotron resistive, a superconductive path exists from terminal 71 through the gate of cryotron K16, the control coil of cryotron K19, and the gate of cryotron K18 to terminal 74. Similarly, when a binary one is stored and an interrogate input representative of binary one is applied to the control coil 72 of cryotron K18, the superconductive path extends from terminal 72 through the gate of cryotron K15, the control coil of cryotron K19, and the gate of cryotron K17 to terminal 74. The current flow in this path maintains the gate of cryotron K19 resistive, indicative of a comparison. When the interrogate input does not compare with the value stored in the trigger AT, the gates of either cryotrons K16 and K17, or K15 and K18, are resistive so that the entire current flows through the other two cryotrons and not through the coil of cryotron K19, thereby allowing the gate of this cryotron to remain in a superconductive state, indicative of the fact that the interrogate input did not compare with the value stored in the trigger. In the circuit about to be described, the block diagram CB shown in FIG. 4A is employed to represent the portion of the compare circuit B shown in FIG. 4 enclosed within the dotted box with the same designations being used in each figure to identify the various leads for the circuit.

Compare Circuit C

Figure 5:
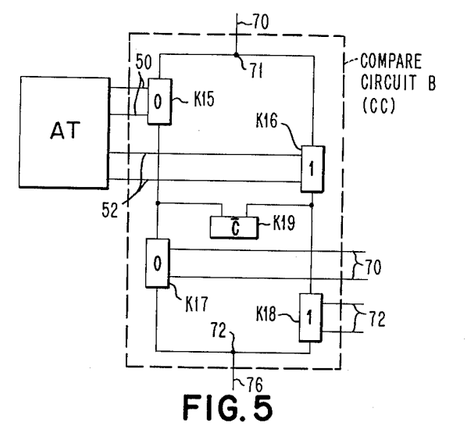
FIG. 5 is a diagrammatic showing of a further embodiment of a compare circuit constructed in accordance with the principles of the invention.

FIG. 5 shows a further embodiment of a compare circuit constructed in accordance with the principles of the invention. This circuit, which is termed compare circuit C, is similar to that shown in FIG. 4 and, for this reason, corresponding designations are used to indicate corresponding elements and terminals in the circuit. The only difference between the circuits of FIGS. 4 and 5 is that the cryotrons K17 and K18 of FIG. 4 have been transposed in the circuit of FIG. 5 so that the output cryotron which is again designated K19 is driven resistive when the interrogate input does not compare with the value stored in the trigger AT. Thus, when the interrogate input compares with the value stored in the trigger, either cryotrons K15 or K17 are resistive and cryotrons K16 and K18 superconductive, or the former cryotrons are superconductive and the latter resistive so that there is no current in the control coil of cryotron K19. However, when the interrogate input does not match the stored value, the only superconductive path through the circuit includes the control coil of K19 so that the gate of this cryotron is in a resistive state. In the other figures about to be described, the block diagram shown in FIG. 4A is also utilized to represent the comparison circuit of FIG. 5 with the change that the diagram is designated CC instead of CB and, further, the designation $\overline{C}$ is used within the block employed to represent the gate of cryotron K19 to indicate that this cryotron is resistive only when the interrogate input does not compare with the value stored in the trigger.

One basic and important difference between the circuits of FIGURES 4 and 5 and the circuit of FIG. 3, as well as other comparison circuits previously known in the art, is that in the circuits of FIGS. 4 and 5, regardless of whether or not the interrogate inputs compare or do not compare with the value stored in the trigger, there is always a completely superconductive path through the circuit, thereby allowing a number of such circuits to be connected in series with the same current source as is demonstrated in the embodiments of the invention about to be described.

Compare Circuit D

The compare circuit shown in this figure corresponds to that shown in the above cited Proceedings of the Eastern Joint Computer Conference. In this circuit, the trigger AT controls the state of cryotrons K21 and K22 and the interrogate inputs are applied to control the state of cryotrons K23 and K24. The input current is applied to a lead 80, which is connected to a terminal 82, and flows through at least two of these cryotrons to a terminal 84 which is connected by a lead 86 either directly or through further superconductive circuitry to ground. In operation, this comparison circuit provides a path in which current may flow from terminal 82 to terminal 84 which is superconductive when the interrogate input does not compare with the value stored in the trigger. When there is a comparison between the interrogate input and the value stored in the trigger, this comparison circuit is resistive. The block diagram CD shown in FIG. 6A is employed in circuits later to be described to represent the compare circuit D shown in FIG. 6.

Compare Circuit E

Figure 6:
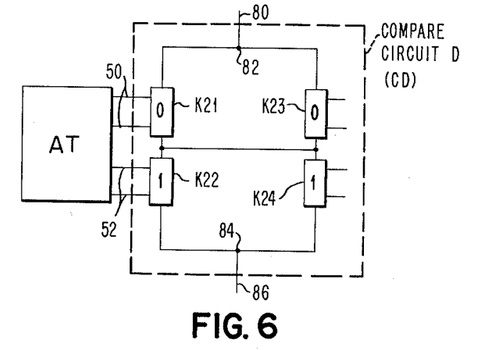
FIGS. 6 and 7 are diagrammatic representations of cryotron compare circuits.
Figure 6A:
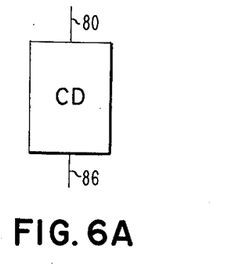
FIGS. 6A and 7A are block diagram representations of the compare circuits of FIGS. 6 and 7, respectively.

This comparison circuit is similar to that of FIG. 6, differing only in that the position of the interrogate cryotrons K23 and K24 have been changed so that the circuit is resistive when, upon interrogation, a non-comparison is indicated and is superconductive when a comparison is indicated. The block diagram CE shown in FIG. 7A is hereafter employed to represent the compare circuit E of FIG. 7.

Compare Circuit F

Figure 8:
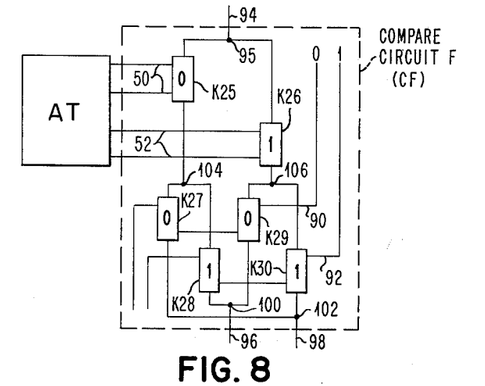
FIG. 8 is a diagrammatic representation of a further embodiment of a compare circuit constructed in accordance with the principles of the invention.
Figure 8A:
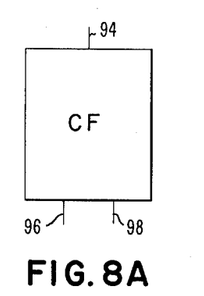
FIG. 8A is a block diagrammatic representation of the compare circuit of FIG. 8.

This compare circuit which is shown in FIG. 8 differs from those previously described in that it is operable to steer a supply current to one or the other of two output terminals or leads in accordance with whether the interrogation input compares or does not compare with the value stored in the trigger AT. This circuit includes the gates of six cryotrons K25–K30. One or the other of the cryotrons K25 and K26 is resistive in accordance with the value stored in the trigger AT. Cryotrons K27 and K29 are driven resistive when a signal is applied to a lead 90, indicative of an interrogate input representative of binary zero, and cryotrons K28 and K30 are driven resistive when a signal is applied to lead 92, indicative of an interrogate input representative of binary one. Supply current for the circuit is applied to a lead 94 which is coupled to a terminal 95. The output for the circuit is realized at one or the other of two output leads designated 96 and 98 which are connected to terminals 100 and 102, respectively. When, upon interrogation, the interrogate input compares with the value stored in the trigger AT, the current is steered from terminal 95 to terminal 102 and, thus, to output lead 98; and, when the interrogate input does not compare, the current is steered to terminal 100 and, thus, to terminal 96. In all cases, there is at least one completely superconductive path from the terminal 96 to either one or the other, but not both, of the terminals 96 and 98. For example, when the trigger AT is in the one condition and, therefore, cryotron K26 is resistive and K25 superconductive, the current flows from terminal 95 through cryotron K25 to a terminal 104. From this terminal, the current will be directed through cryotron K27 to output terminal 102 when the interrogate input is representative of a binary one and, therefore, a comparison is indicated, and through the cryotron K28 to terminal 100 when the interrogate input is a binary zero and, therefore, does not compare with the value stored in the trigger. Similarly, when the trigger AT is storing a binary zero, the current from source 95 is directed to a terminal 106 and thence through either cryotron K29 or K30 to terminal 100 or 102 in accordance with whether the interrogate input is a binary one or a binary zero. The block diagram CF shown in FIG. 8A is employed in the circuits later to be described to represent a compare circuit F of FIG. 8.

Read Out Circuit

Figure 9:
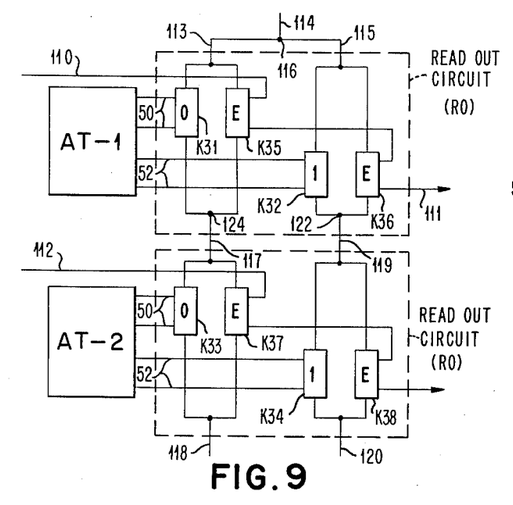
FIG. 9 is a diagrammatic representation of two read out circuits constructed in accordance with the principles of the invention with the circuits being connected as in one column of a memory system.

FIG. 9 shows two positions of a memory register wherein binary information is stored in two addressable triggers designated AT–1 and AT–2. These positions are connected in one column of an array of columns and rows of memory positions. The circuitry shown associated with these triggers is employed to selectively read out the information stored in the triggers AT–1 and AT–2. Each of the read out circuits is shown enclosed within a dotted box designated RO. The read out circuit RO which is associated with trigger AT–1 includes a pair of cryotrons K31 and K32, the states of which are controlled in accordance with the value stored in trigger AT–1. Similarly, the read out circuit associated with the trigger AT–2 includes a pair of cryotrons K33 and K34, the states of which are controlled in accordance with the value stored in trigger AT–2. Each of these read out circuits is also provided with a pair of enable cryotrons which, in the read out circuit associated with trigger AT–1, are designated K35 and K36, and, in the read out circuit associated with trigger AT–2, are designated K37 and K38. The state of the cryotrons of K35 and K36 is controlled by enable signals which are applied to an enable line the input lead of which is designated 110 and, similarly, the state of cryotrons K37 and K38 is controlled by enable signals applied to an enable input designated 112. The output lead for these enable lines are designated 111 and each of these leads may be connected to further read out circuits which are to be enabled in response to signals applied to input leads 110 and 112. The read out current for the circuit is applied at a lead 114 which is connected to a terminal 116, from which point the current is steered to one or the other of two output leads 118 and 120 for the particular column in which the triggers AT–1 and AT–2 are connected. When the current from terminal 116 is steered to terminal 118, it indicates that a particular one of the triggers in that column then being interrogated is in the binary one state, and when current is steered to lead 120, it indicates that the trigger being interrogated is in the binary zero state. The particular one of the triggers which is interrogated when a read out pulse is applied to lead 114 is controlled by applied an enable signal to a selected one of the enable line 110 or 112. For example, consider the case where trigger AT–1 is in the binary zero state and it is desired to interrogate the state of this trigger. In this case, cryotron K31 is resistive and cryotron K32 is superconductive. In order to interrogate the trigger, it is necessary to apply an enable pulse to lead 110 and thereby drive enable cryotrons K35 and K36 resistive. No signal is applied to enable lead 112 so that enable cryotron K37 and K38 remain in a superconductive state. When, with the cryotrons in this condition, a read out pulse is applied to lead 114, since cryotrons K31, K35 and K36 are resistive, the current is directed through the then superconductive cryotron K32 to a terminal 122. The current the passes through the enable cryotron K38, which is then in a superconductive state, to output lead 120 to indicate the binary zero condition of trigger AT–1. Similarly, when the trigger AT–1 is in the binary one condition, the current from terminal 116 is directed through the then superconductive cryotron gate K31 to a terminal 124 and thence through enable cryotron K37 to terminal 118, indicative of the binary one stored in trigger AT–1. The operation is similar when it is desired to interrogate trigger AT–2 with the exception that, in this case, an enable pulse is applied to lead 112 to drive enable cryotrons K37 and K38 resistive, and no pulse is applied to enable lead 110 so that cryotrons K35 and K36 remain in a superconductive state. Since, as in the above described interrogation, the enable cryotrons K35 and K36 provide a superconductive shunt for cryotrons K31 and K32, the current from terminal 116 is steered to lead 118 or 120 in accordance with the state of cryotrons K33 and K34 which are controlled in accordance with the value then stored in trigger AT–2. It can be seen that any number of read out circuits for triggers such as AT–1 and AT–2 may be connected in; this manner with all of the zero representing cryotrons in one parallel circuit extending from terminal 116 to the binary one output lead, and all of the one representing cryotrons connected in another parallel path from terminal 116 to the binary zero output lead for the column. Each of the binary one and zero representing cryotrons are provided with shunting enable cryotrons such as are shown in FIG. 9 so that any particular one of the triggers in the column may be interrogated by energizing the particular enable lead for the read out circuit associated with that trigger and then applying a read out pulse to terminal 114.

Figure 9A:
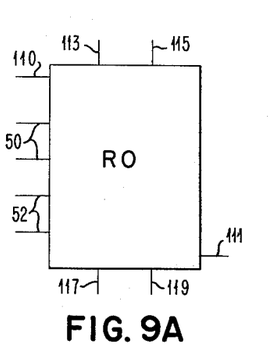
FIG. 9A is a block diagram representation of an individual read out circuit such as is shown in FIG. 9.

In the circuits about to be described, the block diagram RO shown in FIG. 9A is employed to represent the read out circuits of the type shown in FIG. 9, with the designations shown in FIG. 9A corresponding to those used to represent the various current supply leads for the read out circuit associated with trigger AT–1 in FIG. 9.

Figure 10A:
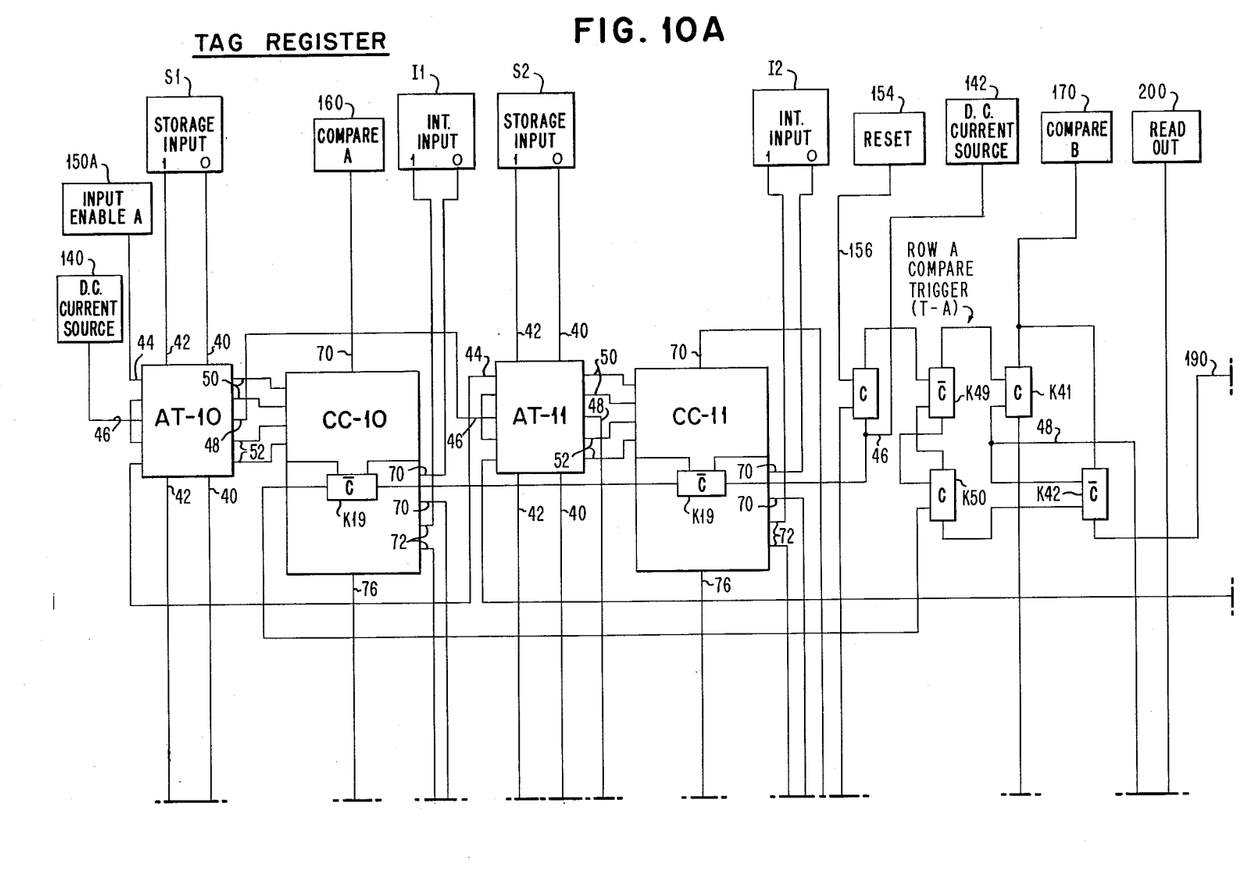
Figures 10B, 11:
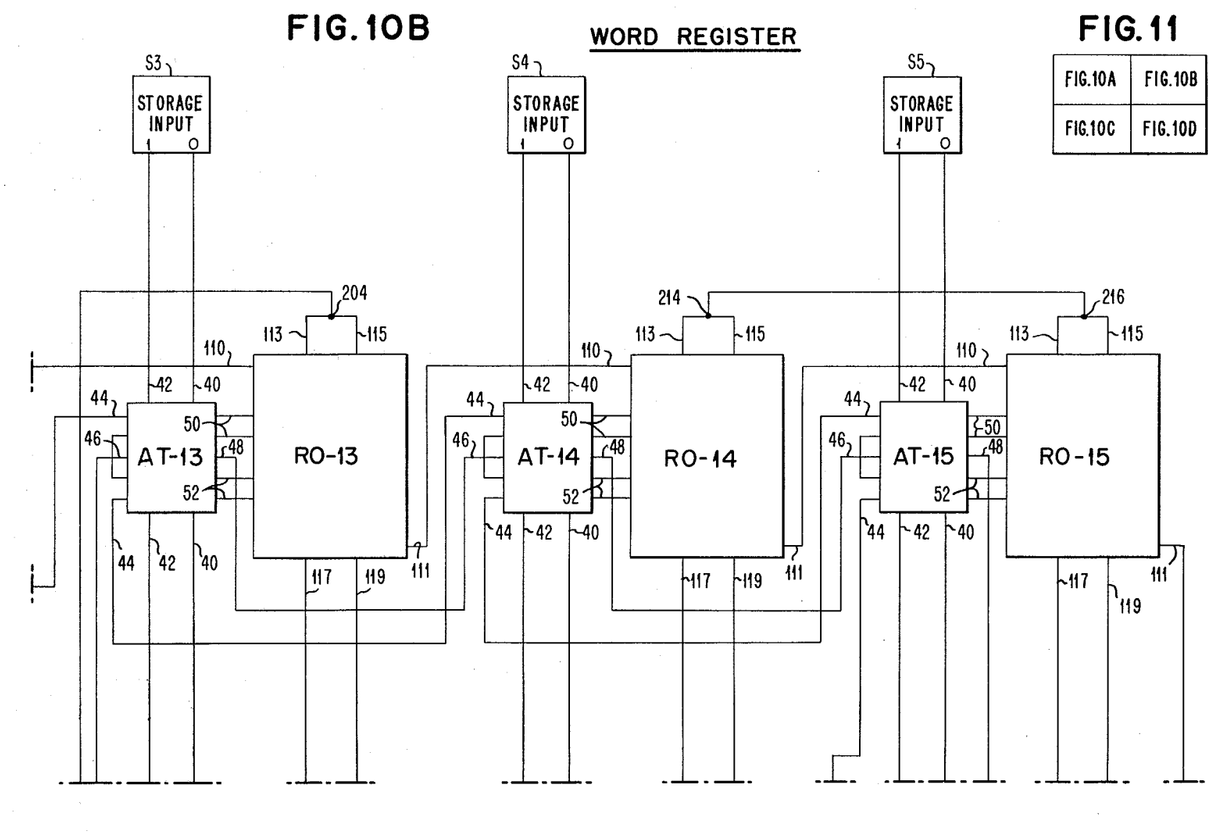
Figure 10C:
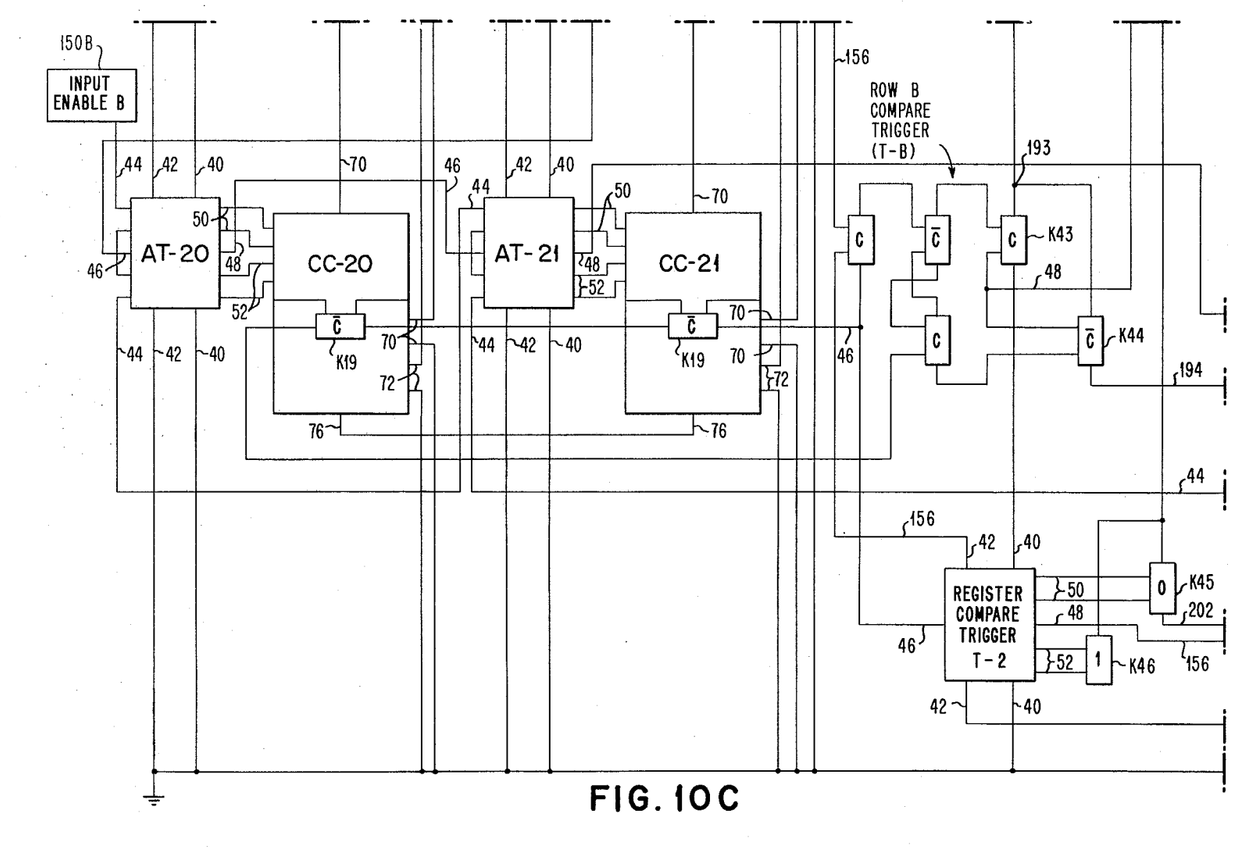

FIGS. 10A, 10B, 10C and 10D, taken together, as indicated in FIG. 11, show a memory system which may be termed an associative or tag memory, the term being employed to indicate that each word stored in the memory has associated with it a tag which is also stored, and the memory is interrogated by applying inputs representative of a particular tag to thereby read out the word associated with that tag if the tag is present in the memory. The Tag Register is shown in FIGS. 10A and 10C, and the Word Register in FIGS. 10B and 10D. These Registers are coupled by a pair of Compare Triggers which are controlled during an interrogation by Tag Register Compare Circuits to cause the proper word stored in the Word Register to be read out. The Tag Register includes two rows of addressable memory triggers of the type shown in FIG. 2. Each of these memory triggers is provided with a compare circuit of the type shown in FIG. 5. There are two memory triggers AT–10 and AT–11 in Row A of the Tag Register and two memory triggers AT–20 and AT–21 in Row B of the Tag Register. The compare circuits are represented by the blocks CC with appended numerals corresponding to those used to identify the memory triggers with which they are associated. The Word Register, similarly, comprises two rows of memory triggers, AT–13, AT–14 and AT–15 in Row A and AT–23, AT–24 and AT–25 in Row B. For each of the memory triggers of the Word Register, there is provided a read out circuit, of the type shown in FIG. 9; the read out circuits are represented by the block diagram representation RO of FIG. 9A with numerals appended corresponding to those employed to identify the memory triggers with which they are associated.

The supply current leads 46 and 48 for the memory triggers AT–10 through AT–15 and AT–20 through AT–25 are connected in series with a D.C. current source 140 which continuously supplies currents to each of these triggers. In a similar manner, the Row A and Row B compare triggers and a group of triggers T–2 through T–5 which are employed to indicate the outputs when the memory is interrogated have their current supply leads 46 and 48 connected in series with a second D.C. current source 142 which continuously supplies current to these triggers. Though two sources 140 and 142 are shown, it should be noted that a single D.C. source may be utilized to provide supply current for all of the above mentioned triggers.

*Read In Operation*

With D.C. current being supplied, information may be read into the memory by actuating one or the other of a pair of Input Enable pulse sources "A" and "B," which sources are designated 150A and 150B in FIGS. 10A and 10C, and then controlling a plurality of Storage Input pulse sources S1 through S5, there being one such source connected for each column in the memory, so that each applies a signal representative of either a binary one or binary zero to the addressable triggers in the column to which it is connected. The Input Enable pulse source 150A is connected to the enable inputs 44 for each of the triggers AT–10 through AT–15 in Row A of the memory and the source 150B is connected to the enable inputs for each of the triggers AT–20 through AT–25 in Row B of the memory. Thus, for example, a tag is entered in Row A of the Tag Register by energizing source 150A and then causing input sources S1 and S2 to apply pulses representative of binary one or zero to the input lead 42 and 40 of triggers AT–10 and AT–11. At the same time, the word corresponding to this tag is entered in the Word Register under the control of the pulses supplied by sources S3, S4 and S5 to triggers AT–13, AT–14 and AT–15, respectively. As was pointed out in the description above of these addressable triggers with particular reference to FIG. 2, their state may not be changed unless their enable inputs are energized. Thus, in the operation described above, with no pulse supplied to the enable inputs of the triggers in Row B of the memory, binary one and binary zero pulses supplied by sources S1 through S5 do not affect the state of these triggers. A tag and corresponding word may be entered into the triggers in Row B by causing source 150B to apply a pulse to the enable inputs for these triggers and then causing storage input sources S1 through S5 to apply pulses representative of the binary values for the tag and word to be entered. During this input operation, no enable pulse is applied by source 150A so that the triggers in Row A are unaffected by the pulses supplied by sources S1 through S5.

*Compare Operation*

Once the memory register has received its inputs as above described, comparison operation may be undertaken. The first step in such an operation is to cause a reset pulse source 154 to supply a pulse to line 156. This line is connected to control coils for the C input cryotrons of the Row A and Row B compare triggers T-A and T-B, the control coil for the one input cryotron of Register Compare Trigger T-2 and the control coils zero input cryotrons of Output Triggers T-3, T-4 and T-5. Each of the Row Compare Triggers T-A and T-B are similar to the trigger shown in FIG. 2 and normally represented by the block T of FIG. 2A, differing only in that the designation C is used instead of "0" to indicate the cryotron gates which are resistive after an interrogation which results in a comparison, and the designation C̄ is used instead of "1" for those gates which are resistive when the interrogate input does not compare with the values stored in the associated row of the Tag Register. Further, instead of a single binary one input cryotron, each of these circuits is provided with a logical OR input comprising the gates of the cryotrons K19 for the compare circuits in the associated row, which gates are connected in series in one of the parallel paths of the trigger. After the reset pulse is applied, the gates of the output cryotrons K41 and K43 of triggers T-A and T-B, respectively, are in a resistive state and the other output gates K42 and K44 of these gates are in a superconductive state. Similarly, the gate of output cryotron K45 of trigger T-2 is superconductive and that of cryotron K46 is resistive, indicative of the binary one state of this trigger, whereas each of the cryotrons T-3, T-4 and T-5 is in its binary zero representing state.

After the reset pulse has been terminated, a pair of interrogate input sources I1 and I2 are actuated to apply pulses to one or the other of the binary one or binary zero output lines connected thereto, these pulses being representative of the interrogate input to the memory. The interrogate input from source I1 is applied to the proper control coils 70 or 72 for the compare circuits CC-10 and CC-20 in the first column of the Tag Register, and that from source I2 is applied to the proper ones of the control coils 70 or 72 for the compare circuits CC-11 and CC-21 in the second column of the memory Tag Register. Thereafter, a first or "A" compare pulse is applied by a source 160 which source is connected to the supply current input 70 for compare circuit CC-10. The remaining current supply leads for the other compare circuits are connected in series so that the current pulse applied by source 160 is applied to each compare circuit. This series connection is possible since, as pointed out above with respect to the compare circuits of FIG. 5, this compare circuit always provides at least one superconductive path between leads 70 to 76, regardless of whether or not the interrogate input compares or doesn't compare with the value stored in the memory trigger connected to the compare circuit.

In the description above given with reference to FIG. 5, it was pointed out that the gate of the cryotron K19 in this type compare circuit is driven resistive only when the value of the interrogate input is not the same as the stored value. Thus, when the value of the interrogate input for each of the columns in a particular row of the Tag Register is the same as the stored value, none of the output gates K19 for the compare circuits in that row are driven resistive and, therefore, no resistance is introduced into the then current carrying path of the associated Row Compare Trigger and that trigger remains in its reset state. Thus, for example, if the interrogate tag compared with the tag stored in the triggers AT-10 and AT-11, the trigger T-A would not be switched, but would remain as reset by reset source 154 with the gate of cryotron K41 resistive and the gate of cryotron K42 superconductive. However, when any one of the values of the interrogate tag fails to compare with a stored value, the gate of the cryotron K19 in the corresponding compare circuit is driven resistive, thereby switching the compare trigger for that row. For example, if the tag for which the memory is interrogated fails to compare with the tag stored in Row B of the Tag Register so that either or both of the gates K19 of compare circuits CC-20 and CC-21 are driven resistive, the Row B Compare Trigger T-B is switched so that the gate of cryotron K44 is driven resistive and the gate of cryotron K43 is allowed to assume a superconductive state.

After one or both of the triggers T-A and T-B have been switched in accordance with the values of the tag interrogate input, the "A" compare pulse applied by source 160 is terminated and a "B" compare pulse is supplied by a source 170. This source supplies current to a circuit in which the gates of the output cryotrons of triggers T-A and T-B are connected. If the tag input fails to compare with the tag stored in either Row A or Row B of the Tag Register and thus both of the triggers T-A and T-B are switched, the current pulse from source 170 is directed through the then superconductive gates of cryotrons K41 and K43 to the binary zero input lead 40 for the Register Compare Trigger T-2, thereby switching this trigger to the binary zero state to indicate that the tag for which the memory was interrogated was not present in the Tag Register. Where, however, one of the stored tags does compare, so that either the gate of cryotron K41 or that of K43 is resistive, the current from the source 170 is directed through the parallel connected gate of either cryotron K42 or K44, as the case may be, to enable reading out of the word in the Word Register which is associated with that tag. Where both of the stored tags compare, the current from source 170 is directed through the gate of cryotron K42 so that the top row only of the Word Register is enabled for read out.

It should be pointed out that, in some memory applications, it is only necessary that an indication be obtained of whether or not a particular word is or is not stored in a register. The circuits of the Tag Register, together with that of the triggers T-A, T-B and T-2 are sufficient to accomplish this function, since, when the input word or tag fails to compare completely with any of the stored tags, the Register Compare Trigger T-2 is switched to its binary zero state, whereas, when a comparison is obtained in one of the rows, the trigger for that row is not switched from its reset state and trigger T-2 remains in its reset or binary one state. When such an application is practiced, the gates of the compare cryotrons K42 and K44 may be shunted directly to ground.

A further advantage of the circuit above described, wherein the novel compare circuits utilized have their output cryotron gates connected in series to provide an INCLUSIVE OR input for the Row Compare Triggers, is that the characteristics of each of the cryotrons utilized may be the same, and the time constant of the compare trigger circuits is, in all cases, at least as brief as that of a normal six cryotron trigger circuit. This is due to the fact that, when one of the row triggers is switched during an interrogation, the resistance of at least one of the gates of a cryotron K19 is introduced into the circuit, whereas, when a reset pulse is applied, the cryotrons K19 are all in a superconductive state so that the only resistance in the circuit is that of the cross coupled cryotron (for example, K49 or K50 in trigger T-A).

Still another advantage realized with the comparison and interrogate circuitry thus far described is that, in all conditions of operation, there is always at least one completely superconductive path provided for each of the current signals applied and, further, there is only one such superconductive path for each signal applied, with all other paths in parallel therewith including at least one resistive cryotron gate, so that the current signals are quickly and positively directed into the desired paths.

*Read Out Operation*

The pulse applied by the source 170 in the manner described above switches trigger T–2 when the interrogate tag is not present in any of the rows of the Tag Register. However, when there is a comparison between the interrogate tag and a particular tag stored in the Tag Register, this pulse is steered to the output enable coils for the memory units in the Word Register which store the word associated with the particular tag. For example, if the tag for which the memory is interrogated is present in Row A, trigger T–A is switched so that the pulse supplied by source 170 is directed through the then superconductive gate of cryotron K42 to an enable line 190 with which the enable input leads of the read out circuits RO–13, RO–14 and RO–15 in Row A of the Word Register are connected in series. Similarly, when a comparison is realized with the tag stored in Row B of the Tag Register, the compare pulse supplied by source 170 is directed through the gate of cryotron K41 to a terminal 193 and thence through the then superconductive gate of cryotron K44 to an enable drive line 194 for the read out circuits in Row B of the Word Register. Thus, when a comparison is obtained, the Register Compare Trigger T–2 remains in the binary one condition with the gate of cryotron K45 superconductive and the gate of cryotron K46 resistive; and the Row Compare Trigger T–A or T–B, for the row in which the comparison was obtained, is switched to a compare condition so that the pulse from source 170 is effective to enable the read out circuits for that row. The pulse supplied by source 170 is maintained until the read out operation is completed.

Figure 10D:
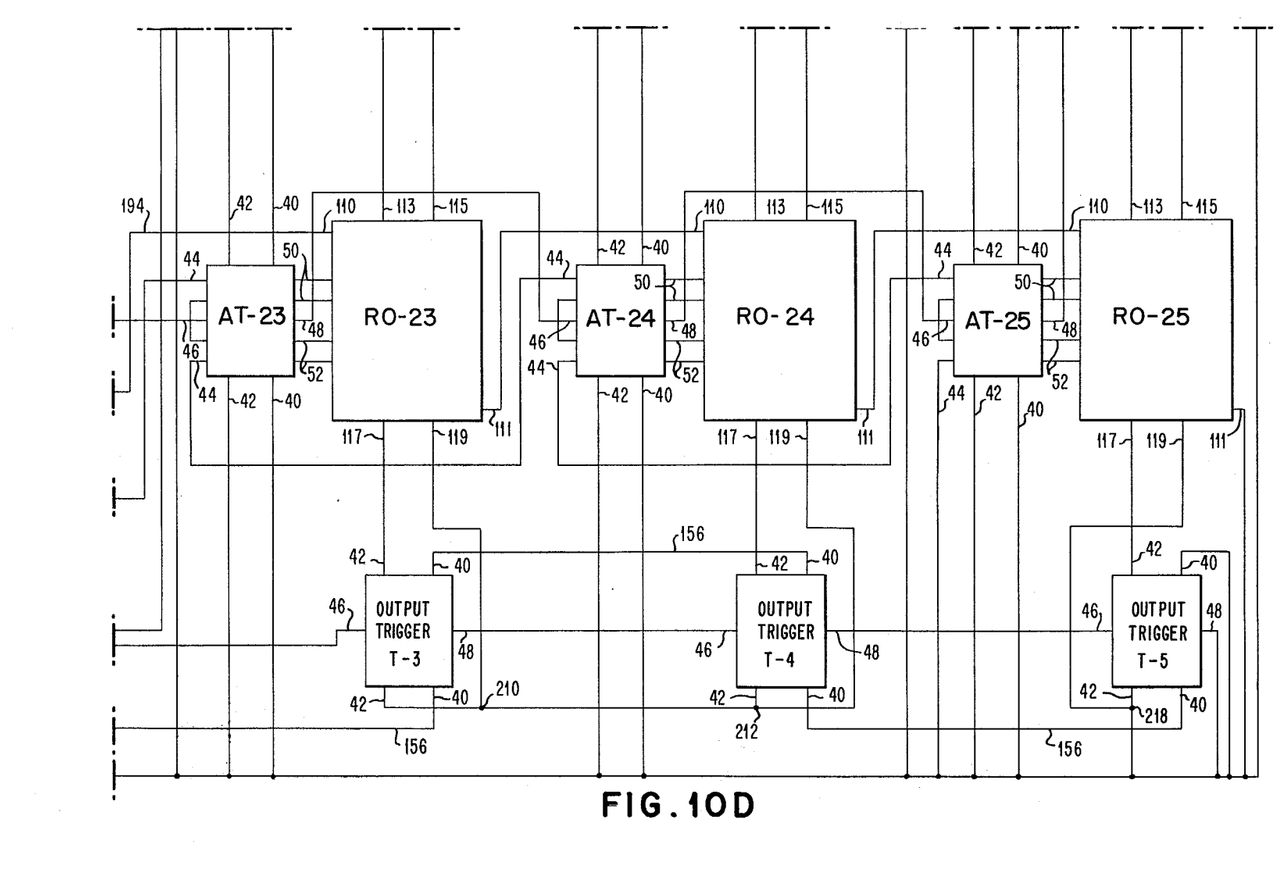

With the circuit in this condition, a read out pulse is supplied by a source 200. This pulse is directed through the then superconductive gate K45 of Trigger T–2 to a read out line 202 for the Word Register. Line 202 is connected to a terminal 204 from which extend in parallel the two input leads 113 and 115 of read out circuit RO–13. The output leads 117 and 119 are connected to the corresponding input leads 113 and 115 of the other read out circuit RO–23 in the first column of the Word Register so that the read out circuit operation is as described in detail above with reference to FIG. 9. The pulse applied to line 204 appears on one or the other of the lines 117 or 119 of the read out circuit RO–23 in accordance with the value stored in the trigger AT–13 or AT–23 which has been enabled for a read out operation. Where the stored value is a binary one, the pulse appears on line 117 of read out circuit RO–23 and is applied to the binary one input lead 42 for output trigger T–3 to set that trigger in the binary one condition. After passing through the control coil of the binary one input for trigger T–3, the read out current pulse is directed to a terminal 210. When the value in the trigger AT–13 or AT–23 then enabled is a binary zero, the read out pulse is directed to output line 119 of read out circuit and thence directly to terminal 210. Thus, the read out pulse is effective to set output trigger T–3 in the one state when the trigger AT–13 or AT–15 being interrogated is storing a binary one and the output trigger remains in the zero state when a binary zero is stored. The read out pulse is directed from terminal 210 to a terminal 212 from whence it is directed either through the binary one input of output trigger T–4 and the binary one path through read out circuits RO–24 and RO–14 to a terminal 214, or directly through the binary zero path through these read out circuits to terminal 214 in accordance with the state of the one of the triggers AT–24 and AT–14 then enabled for read out. The read out pulse is then directed to a terminal 216 and from this terminal to a grounded terminal 218 through the proper one of the paths through read out circuits RO–15 and RO–25 to either set trigger T–5 to the binary one state or allow this trigger to remain in the binary zero state in accordance with the value stored in the one of the triggers AT–15 or AT–25 being interrogated.

Thus, it can be seen that a single read out pulse supplied by the source 200 is directed through the read out circuits for each column of the Word Register, the read out circuits for each column being connected in series with source 200. This pulse sets the output triggers T–3, T–4 and T–5 to indicate the word in the Word Register which is associated with the tag in the Tag Register for which a comparison was indicated when the interrogate tag input was applied by sources I1 and I2. It should be noted that regardless of the state of the various triggers and read out circuits, there is always one and only one completely superconductive path from source 200 to the grounded terminal 218. Further, note should be made of the fact that when, upon interrogation, no comparison is indicated in any of the rows of the Tag Register, and trigger T–2 is, therefore, switched to its binary zero state so that the gate of cryotron K45 is resistive and the gate of cryotron K46 is superconductive, the read out pulse supplied by source 200 is shunted directly to ground through the latter gate. Further circuitry may, of course, be connected between gate K46 and ground with this circuitry being responsive to perform one or more computer functions when the tag for which the memory system is interrogated is not present in the Tag Register. It should also be mentioned that all of the read out circuits need not be serially connected with a single read out source but these circuits may, if desired, be connected to a number of read out current sources.

In the above described memory system of FIGS. 10A, 10B, 10C and 10D, the compare circuit C of FIG. 5 is used in the Tag Register. The other compare circuits described above might also be utilized in systems of this type either separately in a catalog type operation where only an indication of the presence or absence of a particular word in a memory is obtained, or in conjunction with a Word Register wherein a particular word associated with each tag is read out when an interrogate input matching that tag is applied to the memory system. For example, the compare circuit CA of FIG. 3 might be substituted for that of FIG. 5 in the register shown in FIG. 10A. In such a case, the gates of the output cryotron K13 of the compare circuit of FIG. 3 are connected in series to provide an OR circuit input for the row compare triggers in the same manner as the gates of cryotron K19 are connected in FIGS. 10A and 10C. The only change required in the circuit of FIGS. 10A and 10C when the compare circuit CA is employed is that, since this type compare circuit does not always provide a completely superconductive path, it is preferable to utilize a separate current source for supplying the compare "A" pulse for each column of the register instead of the single source 160 of FIG. 10A.

Figure 7:
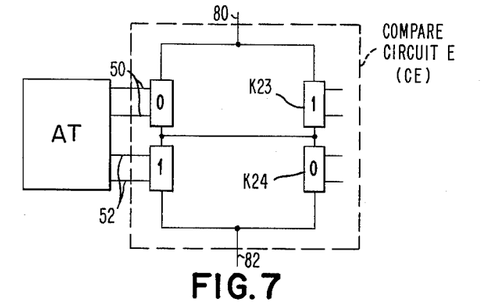
Figure 7A:
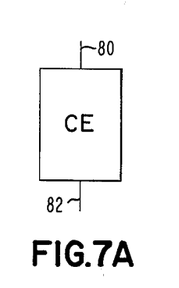
Figure 12:
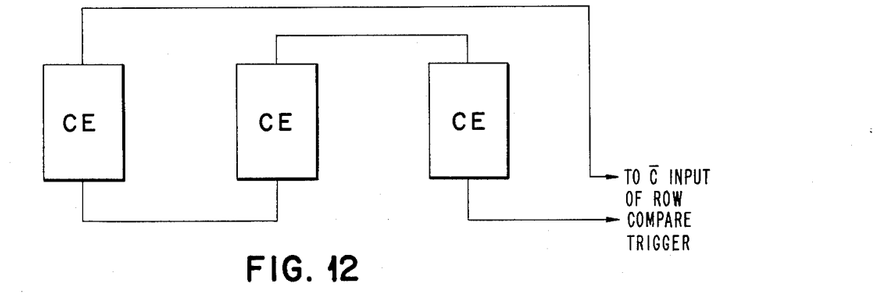
FIG. 12 shows the manner in which a number of compare circuits of FIG. 7 are connected in a catalog and/or associative memory system constructed in accordance with the principles of the invention.

The compare circuit CE of FIG. 7 might be similarly employed with the circuit connections to the row compare triggers being made as indicated in FIG. 12, wherein three compare circuits for one row of a Tag Register or catalog memory are shown. Since the compare circuits CE are either superconductive or resistive in accordance with whether a comparison or no comparison is obtained, it is not necessary to utilize a source such as source 160 of FIG. 10A to supply a compare "A" pulse in systems employing the compare circuit CE. Rather, as is shown in FIG. 12, the compare circuits themselves are connected in a series circuit in one side of the corresponding row trigger so that, when the interrogate inputs applied are effective to drive any one of these series connected compare circuits resistive, the corresponding Row Compare Trigger (e.g. T–A or T–B) is switched to its "no compare" state.

Figure 13:
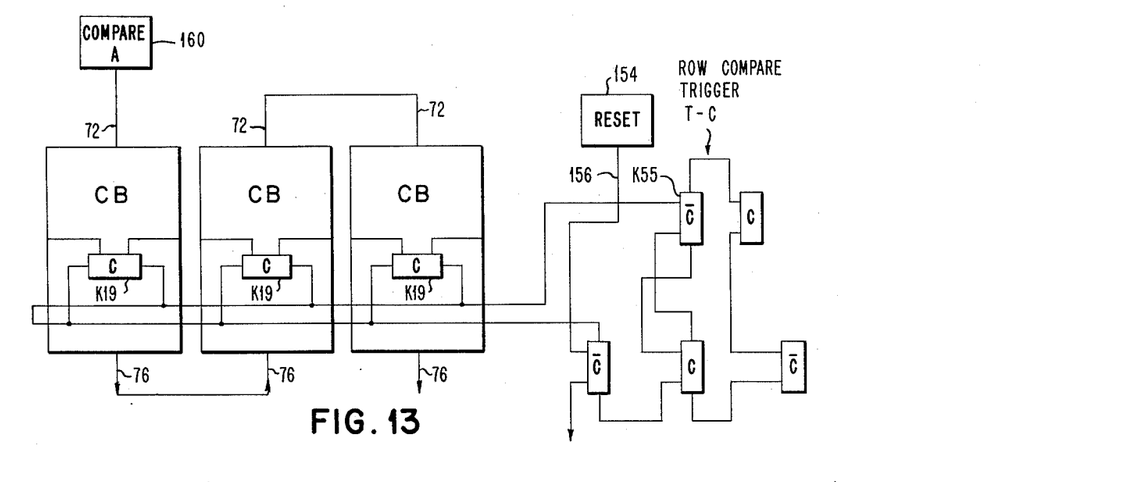
FIG. 13 is a diagrammatic showing of the manner in which a plurality of the compare circuits of FIG. 4 are connected in a catalog and/or associative memory system constructed in accordance with the principles of the invention.

The compare circuits CB and CD, each of which provides a resistive indication only when the interrogate input compares with the stored value, may also be used in systems such as are described above. One row of such an arrangement of the compare circuits CB shown in FIG. 4 is illustrated in FIG. 13. Here, as in FIG. 10A, a single source 160 is connected in series with all of the compare circuits CB which provide completely superconductive paths regardless of whether the interrogate input applied does or does not compare with the value stored in the associated storage trigger. The compare A pulse, as in the system of FIG. 10A, controls the cryotron K19 for each compare circuit in accordance with whether or not a comparison is obtained. However, with the compare circuit CB, only the cryotron K19 for compare circuits in which a comparison is obtained are driven resistive, and the gates of these cryotrons are connected in parallel to provide an AND circuit rather than an OR circuit input to the corresponding Row Compare Trigger here designated T–C. With this type of arrangement, the trigger is reset by the pulse applied by source 154 to the "no compare" or $\bar{C}$ state and the trigger is switched to the compare or C state when all of the gates of the cryotron K19 in a corresponding row of the register are driven resistive, indicating a complete comparison. When such a comparison is obtained, the actual resistance which is inserted in the trigger circuit T–C is equal to $R/n$, where R is equal to the resistance of each of the cryotron gates K19 when in a resistive state, and $n$ represents the number of gates connected in parallel in the AND circuit. Therefore, in order that this relatively small resistance be sufficient to switch the trigger, the resistance of the gate of cross coupling cryotron K55 should be approximately equal to the value $R/n$.

Figure 14:
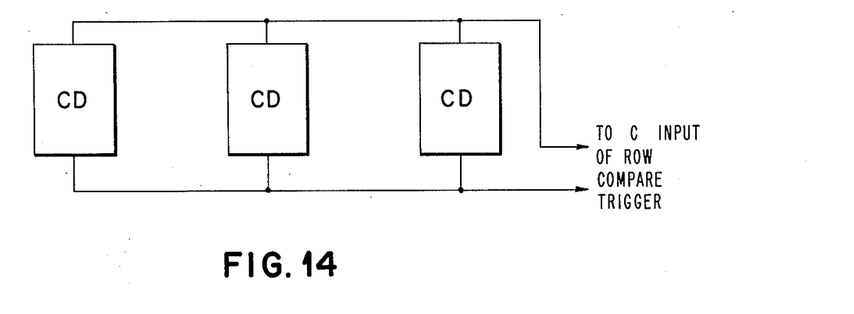
FIG. 14 shows the manner in which a plurality of the compare circuits shown in FIG. 6 are connected in a catalog and/or associative memory system constructed in accordance with the principles of the invention.

FIG. 14 illustrates the manner in which a similar system may be constructed using the compare circuit CD shown in FIG. 6. This compare circuit, as previously explained, is resistive only when the interrogate input compares with the value stored in the trigger associated with the compare circuit. The three compare circuits here shown as representative of one row of one register are connected in parallel to provide an AND circuit input to the C input of the associated Compare Trigger so that this trigger is switched only when every compare circuit in the row is driven resistive when the interrogate inputs are applied. Since the resistive condition is realized when the interrogate inputs are applied, there is no need, in systems employing the compare circuits CD arranged as shown in FIG. 14, for the pulse source 160 of FIG. 13. As in the circuit of FIG. 13, the resistance of the cross coupling cryotron in the compare trigger should be approximately equal to the resistance of the individual compare circuits when in a resistive state divided by the number of compare circuits in the row. The resistance of the individual compare circuits is equal to $R/2$ where R is the resistance of the individual cryotron gates.

Figure 15:
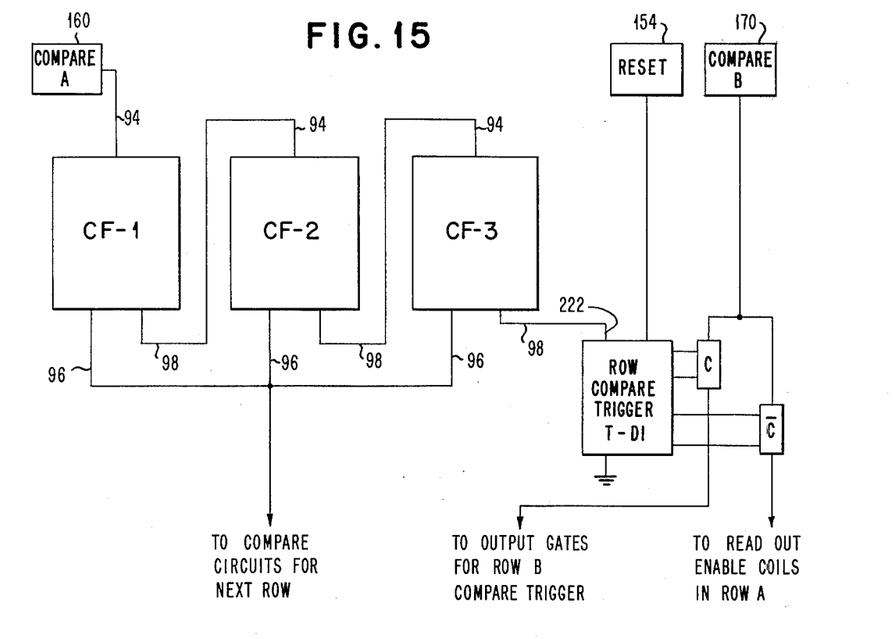
FIG. 15 shows the manner in which a plurality of the compare circuits shown in FIG. 8 are connected in a catalog and/or associative memory system constructed in accordance with the principles of the invention.

The compare circuit CF shown in FIG. 8 may also be used in memory systems of the general type shown in FIGS. 10A and 10B. This compare circuit differs from those previously described in that it acts as a steering circuit to direct current supplied thereto to one or the other of two different output leads in accordance with whether or not the interrogate input matches the value stored in the trigger associated with the compare circuit. FIG. 15 illustrates the manner in which the compare circuits CF of FIG. 8 may be arranged in one row of either a Tag Register or a catalog memory system. The row shown comprises three compare circuits CF1, CF2, and CF3. After the interrogate inputs are applied to these compare circuits in the manner previously described, a pulse is supplied by the source 160 which pulse is directed to the input current lead 94 for the first compare circuit CF1 in the row shown. If the interrogate input applied to this circuit compares with the stored value, this current is directed to lead 98 and from there to the input lead 94 for the next compare circuit CF2. Similarly, if a comparison is obtained in this position, the current is directed to the output lead 98 and compare circuit CF2 and thence to the input lead 94 and compare circuit CF3. Again, if a comparison is obtained in this position, the current is directed to the output lead 98 for compare circuit CF3 and thence to the input for a Row Compare Trigger T–D which is associated with this row of the register. This Row Compare Trigger is, in the manner described in reference to FIG. 13, reset to a "no compare state" by the pulse supplied by reset source 154. The trigger is switched to the compare state when, and only when, a comparison is obtained for each of the compare circuits in the row. These compare circuits, therefore, provide an AND circuit input to the Row Compare Trigger T–D. When the interrogate input for any one of the compare circuits in the row does not compare with the value stored in the trigger associated with that compare circuit, the current pulse supplied by source 160 is directed to output lead 96 for that compare circuit. The output leads 96 are connected in a circuit which shunts the Row Compare Trigger for the row shown and directs the current pulse from source 160 to the input lead for the first compare circuit in the next row.

Therefore, when an interrogate input is applied to a register or memory system utilizing the compare circuit CF connected as shown in FIG. 15, only the Row Compare Trigger for a row in which a complete comparison is obtained is switched. Thereafter, the operation is the same as that described with reference to FIGS. 10A and 10B above wherein a B compare pulse is supplied by a source 170 which is directed either to the lead out enable coils for a row in which a comparison has been obtained or to the Register Compare Trigger for the Tag Register or catalog memory, as the case may be, when the tag for which the memory is interrogated is not present.

Figure 16:
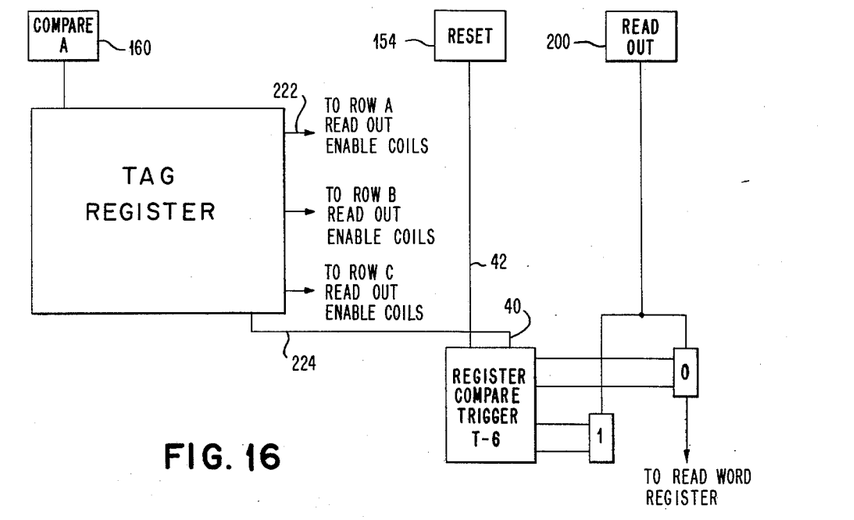
FIG. 16 is a schematic representation of the manner in which a plurality of the compare circuits of FIG. 8 are connected in another embodiment of a catalog and/or associative memory constructed in accordance with the principles of the invention.

When the compare circuit of FIG. 8 is employed in a Tag Register which is associated with a Word Register as shown in FIGS. 10A, 10B, 10C and 10D, the individual Row Compare Triggers may be eliminated. In this case, the operation is similar to that described with reference to FIG. 15 with the exception that the output lead 98 for the last compare circuit in each row is connected directly to the read out enable coils for the read out circuits and the Word Register in the corresponding row. For example, considering the row shown in FIG. 15 to be the first row in such an array, the line 222, which in FIG. 15 is directed to the compare input for the trigger TD, is, in the arrangement of FIG. 16, connected directly to the read out enable coils in that row of the Word Register.

When the interrogate input fails to compare with any of the tags stored in the Tag Register, the compare pulse supplied by source 160 is shunted in each row until it is directed to an output lead 224 which is, in turn, connected to the binary zero input 40 for the Register Compare Trigger here designated T–6. This trigger is, therefore, set in the binary zero condition when the tag for which the memory is interrogated is not present and, when in this condition, prevents the read out pulse supplied by source 200 from being directed to the Word Register. It should be noted that in all of the embodiments described above, though only two or three positions are shown in each row of the register, any number of positions may be included in each row. Further, though in the Tag Register shown and described no read out circuits are provided, it is of course obvious that read out circuits of the type shown associated with the storage triggers in the Word Register may also be provided for the storage triggers in the Tag Register and the read out pulse controlled to read out the information in both registers coincidently as in a conventional memory. When it is desired that the memory be capable of being interrogated in a conventional manner, two cryotron gates may be added to each of the read out circuits with each of these gates connected in series with one of the enable gates, for example, gates K35 and K36 in FIG. 9. These added cryotrons may be controlled by a conventional addressing system so that the information stored in any row of the memory may be read out directly merely by energizing the proper address line and then applying a read out pulse.

It should further be noted that, though, in the illustrative embodiments of the invention shown in the drawings and described above, only cryotron type trigger circuits of the type shown in FIG. 2 are employed as storage devices, it should be apparent that the practice of the subject invention is not restricted to memory systems using this particular type of storage device. For example, persistent current storage units or trigger circuits with the cross coupling cryotrons removed might also be used as storage devices so that the states of output cryotrons corresponding to cryotrons K5 and K6 are controlled in accordance with the information value stored in the memory device.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a superconductor memory system; a plurality of compare circuits arranged in bit columns and word rows; a plurality of superconductive storage devices arranged in corresponding bit columns and word rows; each said storage device storing a bit value of an information word and each connected to a corresponding one of said compare circuits for applying thereto a signal representative of the bit value stored therein; means for interrogating said memory system to determine if a bit information word is stored in any word row said plurality of storage devices comprising, means for applying interrogation signals representative of the respective bit values of said word to all the respective compare circuits in a corresponding bit column; each of said compare circuits being normally superconductive but being capable of providing a resistive output manifestation when the value stored in the storage device to which it is connected fails to compare with the value represented by the interrogation signal applied thereto; and means for indicating the result of said interrogation comprising a plurality of output circuit means each associated with a respective word row of said plurality of compare circuits and each coupled by all the compare circuits in a respective row in series circuit relationship with respect to one another, and responsive to said resistive manifestations thereof in accordance with the INCLUSIVE OR logical function, wherein each of said compare circuits comprises first and second superconductive current paths connected between a first and second terminal and a third path interconnecting said first and second superconductive paths; said signal applied to said compare circuit representative of the value stored in the connected storage device and said interrogation value representing signal applied to said compare circuit being effective to cause portions of said paths to be driven resistive in accordance with the values represented thereby; each of said compare circuits including output manifestation means normally in a superconductive state but responsive to current in said third path only to provide a resistive output manifestation for the circuit.

2. The circuit of claim 1 wherein said compare circuit provides at least one superconductive path between said first and second terminals regardless of whether said value representing signals compare or do not compare.

3. In a memory including a plurality of storage devices each storing a single information bit value; a plurality of read out devices each associated with a corresponding one of said storage devices; each of said read out devices including first and second circuits; each of said circuits including first and second superconductive paths connected in parallel circuit relationship; each of said storage devices being coupled to both the first paths of the first and second circuits of a corresponding read out device and effective to apply signals thereto for controlling one or the other of said first paths thereof to assume a resistive state in accordance with the bit value stored in the storage device; further means coupled to both the second paths of said first and second circuits of each said read out devices for selectively controlling the second paths of any particular one of said read out devices to assume a resistive state so that each of said first and second circuits remain superconductive with the exception of that particular one path in a circuit which was selectively controlled; a read out current source; and means connecting said current source to said circuits so that all first circuits are in parallel with all said second circuits.

4. In a superconductor memory system; a Tag Register including a plurality of superconductor storage devices arranged in columns and rows; a Word Register including a plurality of superconductor storage devices arranged in columns and rows; input means for said memory for first applying signals representative of the values of a first information word to said Word Register and signals representative of the values of a first corresponding tag word to said Tag Register, and then applying signals representative of the values of a second information word to said Word Register and signals representative of the values of a second corresponding tag word to said Tag Register; each of said signals representative of a value of an information word being applied to the storage devices in a corresponding column of said Word Register and each of the signals representative of a value of a tag word being applied to the storage devices in a corresponding column of said Tag Register; said input means including means for controlling said storage devices to be responsive to said signals for causing the values of said first and second information words to be stored in the storage devices in first and second rows, respectively, of said Word Register and the values of said first and second tag words to be stored in the storage devices in first and second corresponding rows of said Tag Register; a plurality of compare devices for the Tag Register each coupled to a corresponding one of the storage devices in the Tag Register and controllable thereby in accordance with the values stored therein; a plurality of read out devices for the Word Register each coupled to a corresponding one of the storage devices and controllable thereby in accordance with the values stored therein; means for applying interrogation signals representative of the values of one of said first and second tag words; each of said interrogation signals being applied to the compare device coupled to the storage devices in a corresponding column of said Tag Register; each of said compare devices being capable of providing an output indicative of whether the value stored in the coupled storage device compares with the value represented by the interrogation signal applied thereto; read out control means coupled to said compare devices and said read out devices; said read out control means being responsive to said outputs provided by said compare devices for controlling the read out devices coupled to the storage devices in the row of the Word Register corresponding to the row in the Tag Register in which the tag represented by said interrogation signals is stored; whereby an information word is read out of said Word Register when interrogation signals representative of the corresponding tag word are applied to said Tag Register.

5. The circuit of claim 4 wherein each of said compare devices is normally superconductive and is capable of providing a resistive output manifestation only when the value stored in the storage device to which it is connected does not compare with the value represented by the interrogation signal applied thereto.

6. The circuit of claim 5 wherein said read out control means are responsive to the output manifestations provided by the compare devices for each row in the Tag Register in accordance with the INCLUSIVE OR logical function.

7. The circuit of claim 4 wherein each of said compare devices is normally superconductive and is capable of providing a resistive output manifestation only when the value stored in the storage device to which it is connected does compare with the value represented by the interrogation signal applied thereto.

8. The circuit of claim 4 wherein each of said compare devices comprises at least first, second, third and fourth unique superconductive paths; and wherein, when said interrogation signals are applied, at least one of said unique paths in the compare devices for each of the storage devices in the Tag Register in which one of the values of said first and second tag words is stored remains in a superconductive state.

9. The circuit of claim 8 wherein each of said compare devices includes first and second terminals and said first, second, third and fourth unique superconductive paths connect said first and second terminals.

10. In a memory including a plurality of storage devices each storing a single information bit value; a plurality of read out circuits each coupled to a corresponding one of said storage devices; each of said read out circuits comprising first and second current input terminals and first and second current output terminals and including first and second superconductive paths connected in parallel circuit relationship between said first input terminal and said first output terminal and third and fourth superconductive paths connected in parallel circuit relationship between said second input terminal and said second output terminal; each of said storage devices including means for controlling one or the other of said first and third paths of the corresponding read out circuit to become resistive in accordance with the single bit value stored in the storage device; and means for enabling said read out circuits comprising means coupled thereto for selectively causing said second and fourth paths of particular ones thereof to become resistive.

11. In a memory system; a read out current source; first and second read out circuits connected in parallel with said source; each of said read out circuits including a plurality of series connected portions divided into first and second parallel paths; said circuits being maintained at a temperature at which they are normally in a superconductive state; a plurality of single bit value storage devices each associated with a corresponding one of said portions of said first read out circuit and a corresponding one of said portions of said second read out circuit; each of said single bit value storage devices including means arranged in magnetic field applying relationship to the first paths of the corresponding portions of said first and second circuits for controlling one or the other of said first paths to assume a resistive state in accordance with the value stored in the storage device; read out enable means including means arranged in magnetic field applying relationship to the second paths of said portions for selectively causing the second paths of the portions corresponding to any particular storage device to assume a resistive state; and output means for said read out circuit comprising means responsive to current in one of said read out circuits.

12. In a memory system; a plurality of value storage devices arranged in groups; a plurality of read out devices each associated with a corresponding one of said storage devices; each of said read out devices including first and second circuits; each of said circuits including first and second parallel connected conductors; each of said conductors being maintained at a temperature at which it is normally superconductive but responsive when a magnetic field is applied thereto to assume a resistive state; each of said storage devices including means arranged in magnetic field applying relationship to said first conductors of said first and second circuits of the coresponing read out device for causing one or the other of said first conductors to assume a resistive state in accordance with the value stored in the storage device; read out enable means for each of said circuits comprising means arranged in magnetic field applying relationship to said second conductors in said first and second circuits for selectively causing said second conductors to assume a resistive state; a read out current source for each of said circuits; said first circuits for the read out devices associated with each group of storage devices being connected in series to provide a first read out current path for that group of storage devices; said second circuits for the read out devices associated with each group of storage devices being connected in series to provide a second read out current path for that group of storage devices; and output means for each group of read out devices including means responsive to current in one of said read out current paths for that group; said first and second read out current paths for each group of read out devices being connected in parallel; said parallel connected first and second read out current paths for each group being connected in series with the parallel connected first and second current paths for the other groups; and output means for each group of read out devices including means responsive to current in one of said read out current paths for that group.

References Cited in the file of this patent
UNITED STATES PATENTS

| | | |
|---|---|---|
| 2,691,154 | Rajchman | Oct. 5, 1954 |
| 2,734,187 | Rajchman | Feb. 7, 1956 |
| 2,768,367 | Rajchman | Oct. 23, 1956 |
| 2,832,897 | Buck | Apr. 29, 1958 |
| 2,837,732 | Nelson | June 3, 1958 |
| 2,843,837 | Thaler | July 15, 1958 |
| 2,856,595 | Selmer | Oct. 14, 1958 |
| 2,877,448 | Nyberg | Mar. 10, 1959 |
| 2,933,720 | Newhouse et al. | Apr. 19, 1960 |
| 2,969,469 | Richards | Jan. 24, 1961 |
| 3,001,178 | Buck | Sept. 19, 1961 |